United States Patent [19]

Applegate et al.

[11] Patent Number: 5,424,949
[45] Date of Patent: Jun. 13, 1995

[54] MULTI-CHANNEL DATA RECEIVER SYSTEM

[75] Inventors: John D. Applegate, Andover; Alan R. Helfinstine, Brooklyn Center; Michael R. Ibis, Maple Grove; Bryan L. Wyberg, Coon Rapids, all of Minn.

[73] Assignee: Honeywell Inc., Minneapolis, Minn.

[21] Appl. No.: 99,794

[22] Filed: Jul. 30, 1993

[51] Int. Cl.[6] .................... G06F 13/00; G06F 15/16
[52] U.S. Cl. ............................. 364/424.06; 395/800
[58] Field of Search ................ 364/424.01, 424.04, 364/424.06, 131; 395/425, 200, 800; 340/825.06; 370/85.13

[56] References Cited

U.S. PATENT DOCUMENTS

| | | | |
|---|---|---|---|
| 4,486,853 | 12/1984 | Parsons | 364/900 |
| 4,729,102 | 3/1988 | Miller, Jr. et al. | 364/424 |
| 4,755,929 | 7/1988 | Outous et al. | 364/200 |
| 4,809,217 | 2/1989 | Floro et al. | 364/900 |
| 5,019,980 | 5/1991 | Starr et al. | 364/424.04 |
| 5,133,081 | 7/1992 | Mayo | 455/18 |
| 5,167,020 | 11/1992 | Kahn et al. | 395/250 |
| 5,218,680 | 6/1993 | Farrell et al. | 395/325 |
| 5,307,505 | 4/1994 | Houlberg et al. | 395/800 |
| 5,321,816 | 6/1994 | Rogan et al. | 395/200 |
| 5,349,685 | 9/1994 | Houlberg | 395/800 |

*Primary Examiner*—Kevin J. Teska
*Assistant Examiner*—Susan Wieland
*Attorney, Agent, or Firm*—Robert A. Pajak

[57] ABSTRACT

The present invention is a system that is used on board an aircraft that receives data, examines the data, and directs the data to appropriate memory devices for future use. A plurality of receivers are coupled to a serial data bus for selectively receiving a sequence of data messages on the data bus. Each of the receivers includes a data register for storing one of the sequential flow of data messages. In turn the receiver provides a data ready signal so that a sequencer can selectively read the data messages from the receiver and either store them in one of a plurality of receivers, or discard the information.

2 Claims, 6 Drawing Sheets

MULTI-CHANNEL DATA RECEIVER SYSTEM

BACKGROUND OF THE INVENTION

1. Field of the Invention

The present invention relates to a multi-channel data receiver for an aircraft data bus system. More particularly, the present invention was directed to a multi-channel data system in which the data words are received, examined and directed to designated storage devices.

2. Description of the Related Art

The operation of aircraft relies heavily on many electrical subsystems for successful flight missions. These electrical subsystems include, among others, flight management, navigation, auto-pilot, global positioning of systems, landing systems, fuel quantity systems, and the like. Many of these electrical subsystems require communications therebetween, alternatively, sensing subsystems may be located remote from the processing subsystems. Since many of these subsystems may be provided by different manufacturers, standards have been defined for the transfer of data messages on data buses that are wired throughout the aircraft. One such standard is the ARINC (Aeronautical Radio Incorporated) 429 Standard.

The ARINC 429 Standard is such that each data messages or data word is defined in a number of bits where certain bits define the information which is being communicated, and other bits define a label which indicates how the information bits are to be interpreted. In the ARINC 429, the data message is 32 bit word in which the first 8 bits define the label, and the later 24 bits define the information.

Commonly, multi-channel receiver systems operative with the ARINC 429 Standard, commonly employed a plurality of data receivers for capturing data from a dedicated ARINC 429 data bus. In turn, only selected ones of these data messages having a preselected label were processed to appropriately store the data information into a primary memory. In turn, the information stored in the primary memory was examined for further partitioning into secondary dedicated memory devices, where each of the second memory devices retained like kind information, for example, only GPS data, or only inertial reference data.

Multi-channel receivers as just described generally store more information in the memory than necessary. This is so, since only certain types of information are required during certain flight operations, for example, in flight, on ground, and take-off. This presents an undue burden on the main memory, and may result in loss of data and poor performance.

SUMMARY OF THE INVENTION

An object of the present invention is to provide a multi-channel data receiver system for efficiently transferring received data into designated memory devices for subsequent usage by one or more system processors.

In the present invention, a dynamically active random access memory is utilized for the storage of subsystem label words. In turn a sequencer reads stored data in receivers coupled to a data bus. Depending upon the match of the label word contained in the data message stored in the receiver and those stored in the random access memory, the data message is stored in a like-kind information memory.

DESCRIPTION OF THE PREFERRED EMBODIMENT

Figure 1:
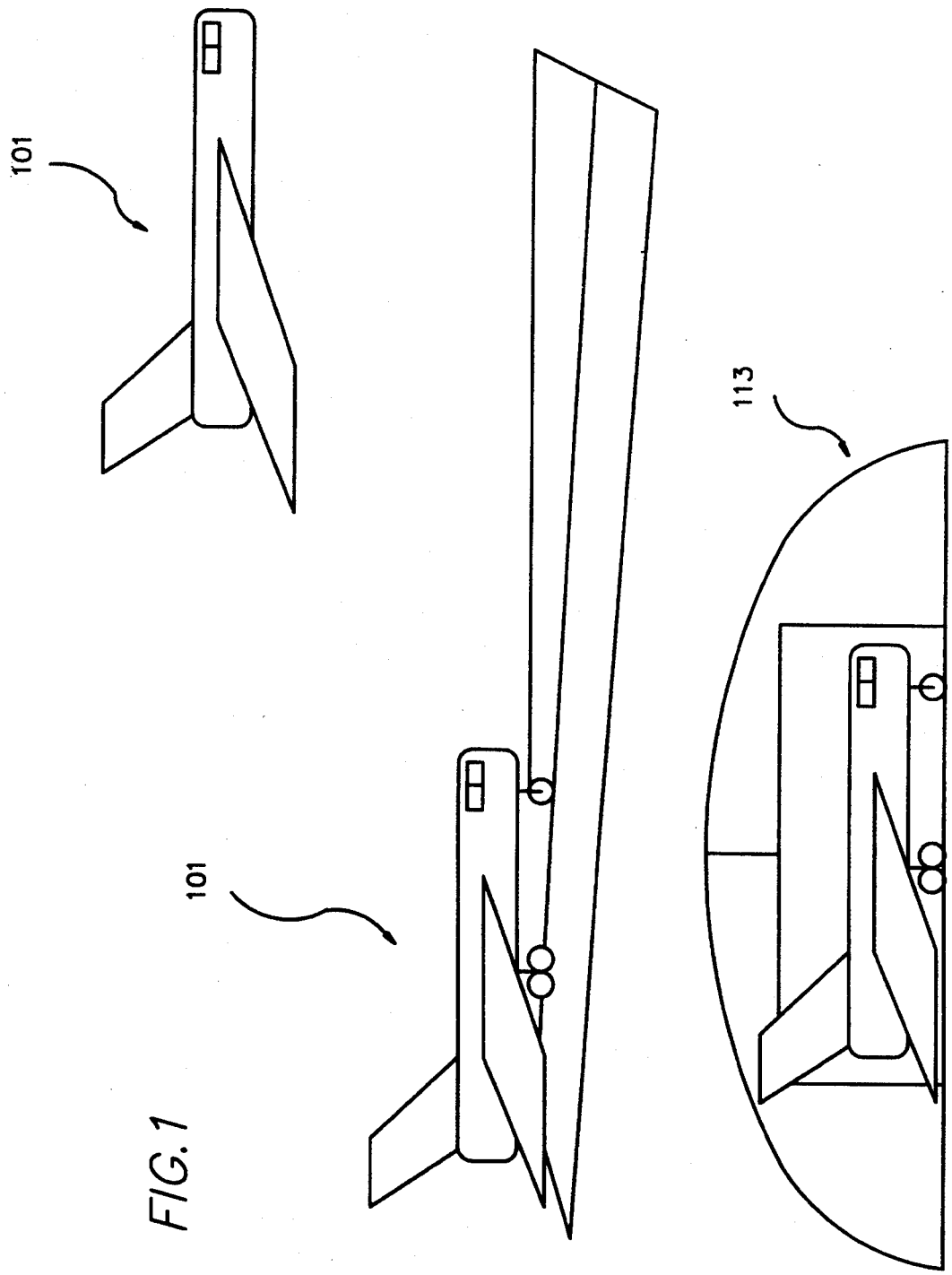
FIG. 1 shows examples of different states of an aircraft which require different information from different subsystems.

FIG. 1 illustrates the employment of a plurality of remote subsystems generating data messages for differing aircraft conditions, for example, in the air, 101, on the ground, 111, and during maintenance, 113. Each of the subsystems generates differing data messages dependent upon differing aircraft conditions. For example, subsystem 1 generates data messages L1 while in air, and generates data messages L1, L2, and L3 while on the ground. Each of these data messages according the ARINC 429 Standard comprises a 32 bit word where 8 bits are reserved for label information, herein referred to as the label word, and 24 bits are reserved for the subsystem information, herein referred to as the subsystem data word. The label word indicates which subsystem generated the information, and in some circumstances the kind of subsystem information contained in the subsystem data word.

Figure 2:
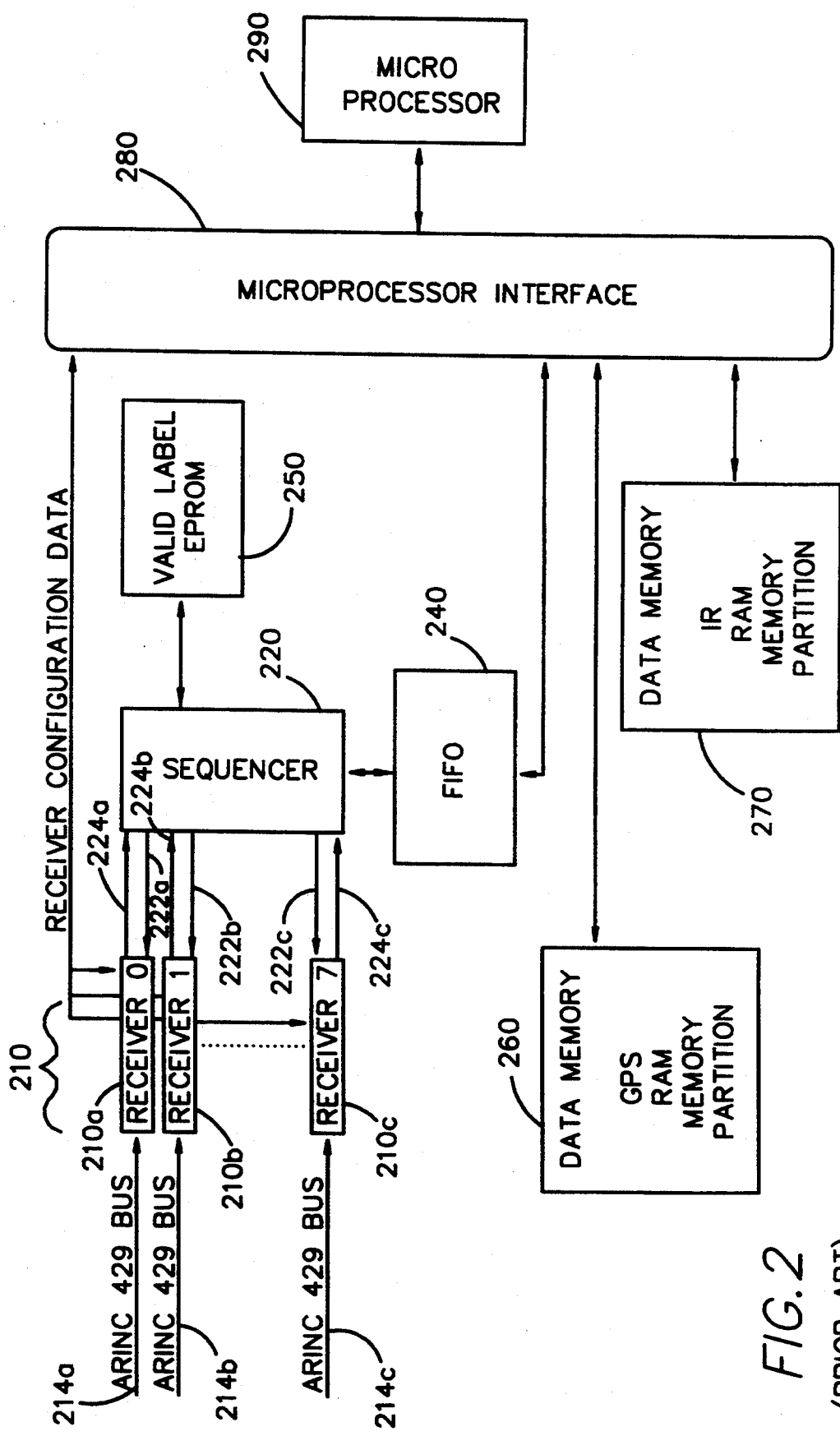
FIG. 2 shows a block diagram of a multi-channel ARINC 429 data receiver.

Shown in FIG. 2 is block diagram of a multichannel data receiver system for capturing data messages generated and transmitted on the ARINC 429 data bus by the subsystems. The captured data message in turn may be stored in one of a plurality of memory devices retaining like-kind of information for subsequent us by a data signal processor for obtaining the intended information, for example flight control signals, or navigation position.

As illustrated in FIG. 2, a plurality of remote subsystems are connected to data receivers 210a–c through ARINC 429 data busses 214a–c. Data busses 214a–c are serial data busses configured according to the ARINC 429 standard for transmitting the 32 bit data message, including the label word and the subsystem data word, as aforesaid.

Data receivers 210a–c are intended to temporarily store the data messages, one at a time, in a receiver data register (not shown) until a sequencer 220 issues a receiver reset signal 222a–c.

Sequencer 220 serves to conditionally receive the receiver data message 224a–c and store the data message in a first capture memory 240 dependent upon whether or not the label word of the received data message matches any of the words stored in a label word look up memory 250. If there is no match between any of the words in the look-up memory 250, sequencer 220 issues a reset signal 222. If there is a match, then the data message is stored in the main memory, and subsequent thereto, the sequencer also issues a reset signal 222, but only after the received data message is stored in the main memory 240.

Further illustrated in the prior art configuration of FIG. 2, are first and second secondary memory devices 260 and 270 which are connected to processor interface 280, and a data signal processor 290 which may be a microprocessor or the like. Secondary memory devices 260 and 270, which may be a single memory having corresponding first and second memory partitions, are intended to store like-kind data messages, for example all inertial reference data messages, GPS data, or other related information. In the prior art system as illustrated, processor 290 served to read the data stored in main memory 240, and transfer the data into one of a plurality of secondary memory devices, for example the two shown in FIG. 2.

Implementation of the system illustrated in FIG. 2 generally employs an EPROM (Erasable Programmable Read-Only Memory) for the label look-up memory device. The desired labels are fixedly stored in the EPROM and form part of an electronic hardware package which is onboard the aircraft, and coupled the ARINC 429 busses as illustrated. However, in such an implementation, if a different set of label words were desired, the hardware package would need to be modified, and more specifically the EPROM incorporated therein would need to be replaced with one having a new set of desired labels. This procedure is very expensive if the set of desired labels changes frequently.

It should be noted that for the scenario illustrated in FIG. 1, all data messages are stored into the main memory even though some messages are unnecessary at different times. Similarly, secondary memory devices are storing unnecessary data messages as well. The sorting system as already described, i.e. secondary memory devices 260 and 270 in combination with processor 290 and main memory 240 may result in loss of data as well as poor performance. This is so, since the sorting system requires much hardware and signal controls to accomplish the intended sorting of the data messages in the secondary memory devices.

Figure 3:
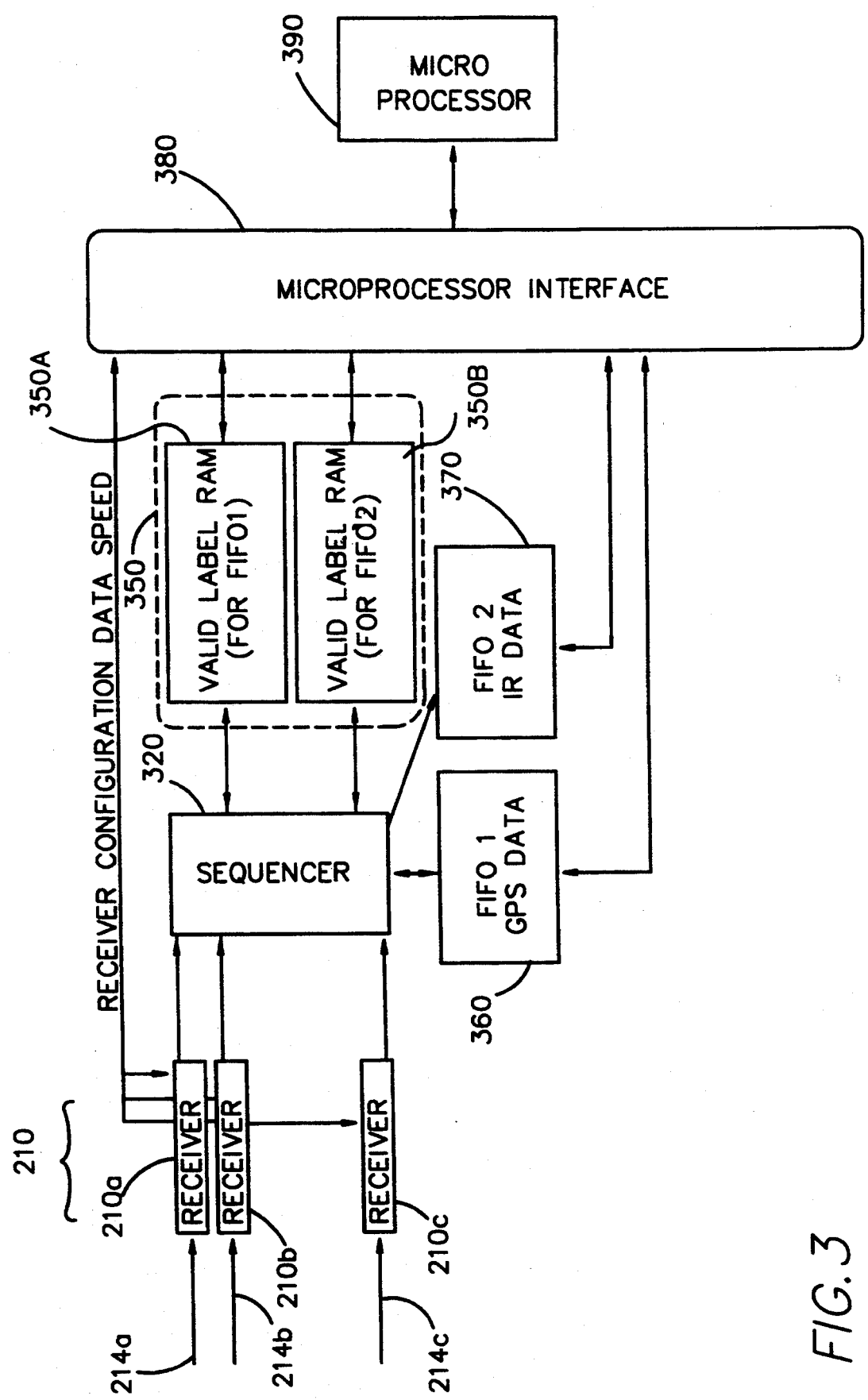
FIG. 3 is a block diagram of a multi-channel data receiver system in accordance with the present invention.

Shown in FIG. 3 is block diagram of a multichannel data receiver system in accordance with the present invention for capturing data messages generated and transmitted on a serial data bus and more specifically in accordance with the ARINC 429 data bus system standard. Those blocks in FIG. 3 functioning in the same manner as those in FIG. 2 have retained the same numeral designation as FIG. 1.

As illustrated in FIG. 3, sequencer 320 is operatively connected to receivers 210a-c similar to sequencer 220 shown in FIG. 2. A random access memory RAM 350 is coupled to microprocessor 390 through processor interface 380 for receiving selected label data information from processor 390 as will be subsequently described.

Further illustrated in FIG. 3 are first and second memory devices 360 and 370 for selectively storing data messages received by receivers 210a-c as determined by sequencer 320. Memory devices 360 and 370 are intended to store data messages of like-kind information in the same manner as that described with respect to secondary memory devices 260 and 270, respectively.

As mentioned previously with regard to FIG. 1, the label designates what type of information is contained in the information bits. Only selected data messages are needed by other system hardware dependent upon the differing aircraft conditions. In the present invention, only those labels needed by the data signal processor at any given time are written into random access memory 350 by microprocessor 390 as required by the processor for executing specific instructions. The label words which are programmed into the random access memory will, of course, change dependent on the differing conditions of the aircraft as aforesaid. For example, the plane will require different data information for when the plane takes off or when the plane is in flight. When the condition changes, microprocessor 390 will erase those label words associated with data messages no longer needed, and write those label words whose data messages are now required. This process is, of course, a very dynamic process.

The writing and storing of label words into memory 350 may be configured by a variety of techniques to provide efficient interaction with sequencer 320 for determining a) a match with the label word of the received data messages, and b) facilitate storing like-kind data messages in the designated memory, for example GPS or IR, memory devices 360 and 370. In the preferred embodiment of the present invention, memory 350 is comprised of two random access memories 350A and 350B, one corresponding to each of the desired like-kind information memory devices. Sequencer 320 uses the 8 bit label word plus a 4 bit index word, which designates which receiver is being checked for a match, as an address, a total of 12 bits, for addressing the random access memory 350. Similarly, microprocessor selectively writes a one or 0 in those label word/receiver index address in selected ones of the two random access memories, for example 350A or 350B which may simply be apparition of a single memory device.

As indicated in the flow diagram, both memories 350A and 350B are addressed, if a match is found in 350A the data message is written into memory 360, if a match is found in 350B, the data message is written into memory 370. In some circumstances, the data message may be desired to be written both memories 360 and 370.

It should be noted that other schemes are of course possible, having advantages and disadvantages. For example, tag bits may be stored in memory 350 address such that the tag word indicates where to store the data messages. It should also be noted that, as indicated in the flow diagram of FIG. 4, that any means for directing data messages of like-kind are within the scope of the present invention, and include a check of the label word of the data message itself checked against another look-up table.

In the preferred embodiment of the invention, memory devices 260 and 270 are intended to function as a FIFO (first-in, first-out) memory which may be provided by a wide array of components, including an addressable random access memory.

Figure 4:
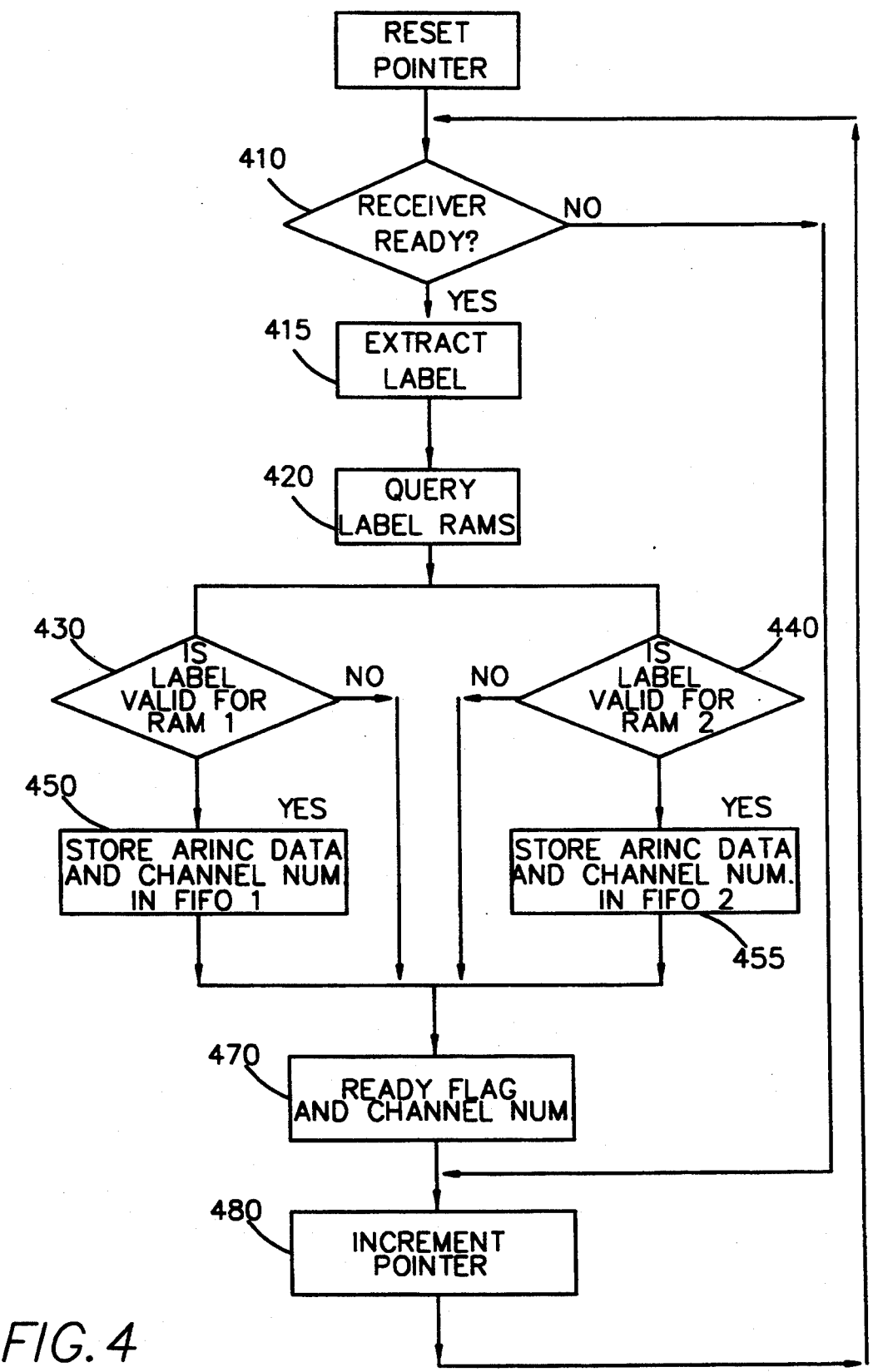
FIG. 4 is a flow diagram illustrating the behavior of the multi-channel data receiver system of FIG. 3.

Illustrated in FIG. 4 is flow diagram illustrating the function and operation of sequencer 320 of FIG. 3. A description of the sequencer will be described for the special case of 3 receivers 210a-c and two like-kind information memories 360 and 370. A pointer or index logic is used to check the status of data ready signal indicative of a stored data message in the receiver data register of each of the receivers, one at a time as indicated by decision block 410. Upon a data ready signal indicated, the label word is read from the data message stored in the receiver register, block 415. The random access memory 350 is interrogated for a determination of a match with a label word stored therein associated with either memory 360 or 370 as indicated by decision blocks 430 and 440 respectively. If there's a match, the data is stored, blocks 450 and 455, and subsequently the receiver 210 is reset, block 470 for receiving another data message. If no match was obtained, no data is stored and the receiver is reset. In turn the pointer is incremented to check the next receiver, block 480.

The data receiver architecture as just described allows for software partitioning and time ordering of received data, particularly ARINC 429 standard data. Software partitioning techniques use memory management to apportion access of functions to different memory blocks 360 and 370. Access to these memory blocks by different partitions is strictly controlled by the processor 390. In this way, a failure in one software partition cannot compromise the operation of other partitions. This separation is required in critical avionics functions.

The time ordering is accomplished in the present invention by the use of FIFO memories 360 and 370, which may be single memory of different partitions. Global Positioning Systems (GPS) data messages are identified and transferred to a different FIFO memory or different partition than the inertial Reference data messages. This data message sorting in accordance with the present invention reduces software overhead since the software kernel is not required to sort and transfer received data messages.

The like-kind information label words are dynamically alterable by the processor 390. The partition separation insures the integrity of the labels in the other partition. The dynamic alteration of the label words capability in accordance with present invention allows different label words to be accepted or rejected at varying point in time. For example different points in the flight mission, or data message needed only for initialization, and rejected thereafter.

The system of the present invention has tremendous advantage over the prior art particularly for GPS/IR system avionic need. This is so since the processor of the prior art had to read unsorted ARINC 429 data and sort and store GPS and IR data in separate memory partitions. The individual software partitions would then read the rewritten data and act upon it. In the present invention, need for sorting and re-writing GPS and IR data while preserving the time ordering of received data is eliminated.

Figure 5:
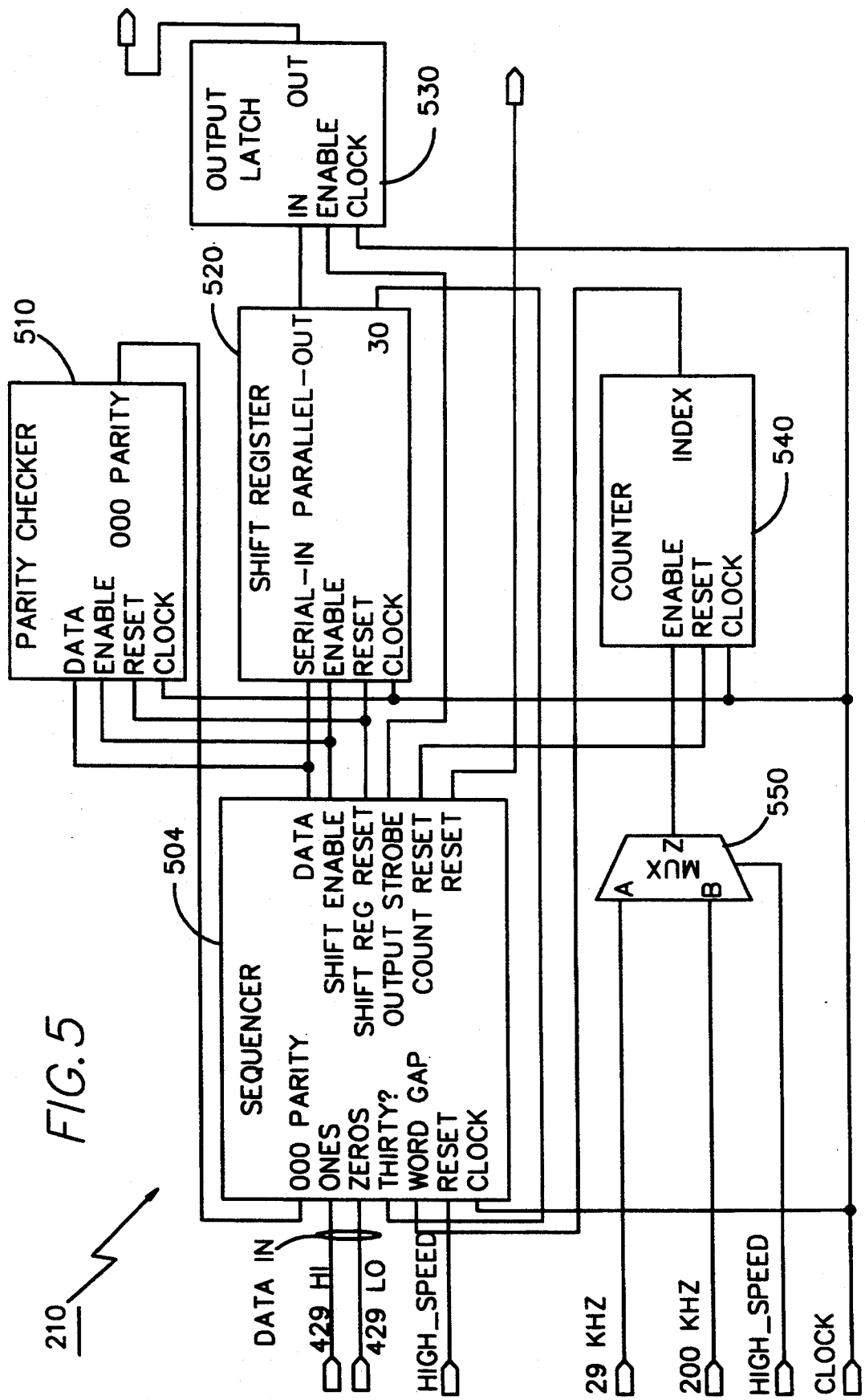
FIG. 5 illustrates a schematic block diagram of the a receiver employed in the block diagram of FIG. 3.

Shown in FIG. 5 is schematic block diagram of one embodiment for a receiver 210. Receiver 210 is configurable to accept high speed or low speed serial data and convert it to parallel 32 bit words. Receiver 210 includes sequencer 504, parity check circuit 510, shift register 520, latch 530, bit counter 540, and multiplexer 550. The operation of the receiver as depicted in FIG. 5 is particularly illustrated by the flow diagram of FIG. 6, more specifically the function executed by the sequencer circuit 504 of FIG. 5.

Serial ARINC 429 data, namely the 32 bit word data in a "three-state" configuration, entered the receiver and is synchronized to the system clock, either high or low speed. The receiver resets the bit counter (word gap timer 630 of flow diagram of FIG. 6) when a data bit is first received. If 32 bits are received with no word gaps, the word is checked for correct parity by parity check circuit 510. Once a word of proper length is detected, the ,data word is stored in the output latch 530, and the ready flag signal output is set. If the output latch already has a valid word stored, indicted by the ready flag already being set, the new word is not stored, but discarded. In either case, the receiver is then initialized to get ready to receive another word.

Figure 6:
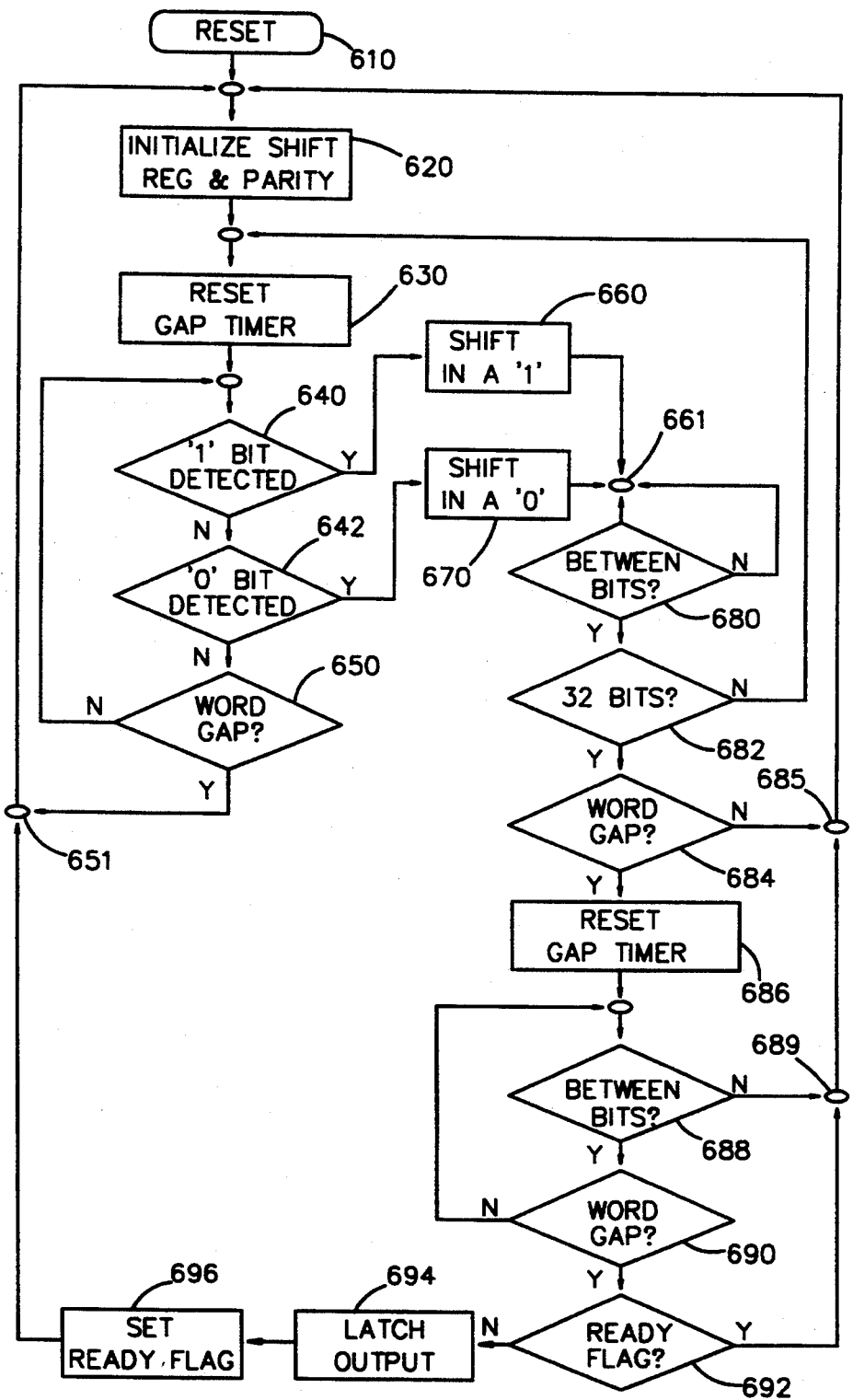
FIG. 6 illustrates a flow diagram illustrating the behavior of the receiver of FIG. 5.

Referring now to FIG. 6, thereshown is a flow chart illustrating the flow of data messages in the receiver 210 as monitored for correctness by the sequencer to obtain high data integrity. The data messages are in a "three-state" form so three possible states could exist for each bit of the data message: "1", "0", or no signal. A data message from the ARINC 429 enters the receiver 210 and is synchronized to the system clock. The shift register 520 is initialized so that all 32 bits are "0". The shift register has 33 bits and the last bit is initialized to "1" so the receiver knows when the data message has completely been transferred. Next, the sequencer 504 checks for a "1" or "0" bit. If no signal exists for 4 bit cycles, the receiver checks for the next data message, because no signal for 4 bit cycles designates the end of a data message. If a "1" or "0" bit is detected, the data message is transferred through the receiver 210 to output latch 530. The gap timer or bit counter 540 is reset so that the next gap can be counted to determine if a gap exists in the next data message or if the data message is completely transferred. Once a word gap of the 4 bit cycles is detected, the data is stored in an output latch and the ready flag is set signaling that the data message is available for subsequent processing through sequencer 320 or alternatively 220 of the prior art. If the output latch already has a valid word stored in it, then no new word is stored, but discarded instead. In either case, the receiver is initialized to prepare for receiving more data.

In practice of the receiver as illustrated by FIGS. 5 and 6, the receiver rejects; wrong frequency data, words with too few bits, words with too many bits, bad parity, and if the previous received word has not been read thereby providing high data integrity.

The receiver as illustrated herein avoids the need for utilization of the self-clocking characteristics of ARINC 429 standard data. Employment thereof permits the reception of low speed data on high speed channel or reception of word fragments. These conditions allow for processors to perform calculations with corrupted data. Practice of the receiver as disclosed herein provides high data integrity as compared with the self clocking design.

It should be recognized by those skilled in the art that circuit construction beyond that which has been disclosed herein is intended to be within the true spirit and scope of the present invention. Although a specific embodiment has been shown for multichannel data receiver system in accordance with present invention, others are of course possible within the level of skill in the art, and are within the true spirit and scope of the present invention.

More specifically, the foregoing description has been set forth in terms of functional block diagrams including registers, counters, timers, and logic means, and also illustrated in terms of flow diagrams to enhance understanding of the present inventions without burdening the reader with detail well known within the level of those skilled in the art. There are, of course, a wide array of implementations for achieving the intended function as depicted in the accompanying claims, all of which are intended to be within the true spirit and scope of the present invention. It should also be noted that although a specific embodiment has been illustrating specific memory devices, there are of course a wide array of components for serving the intended function.

More specifically, FIFO memories may be implemented by an addressable random access memory. Lastly, although the embodiment of the invention has been illustrated, at least in part, by specific data transfer being serial or parallel, alternate arrangements are, of course, within the true spirit of the present invention is defined by the accompanying claims.

It should also be noted that all, or selected ones of any of the electrical circuit components may be configured into a single integrated circuit and that the separation of components as illustrated in the Figures is within the true spirit of the present invention and is defined by the accompanying claims.

We claim:

1. A multichannel data receiver system for distributing data messages received on a data bus to a plurality of like-kind information memory devices, where said data messages have a fixed word bit length in which a plurality of bits define a label word indicating the subsystem origin of said data message, and the remainder bits define an information data word, said multi-channel data receiver system comprising:

a plurality of receivers each coupled to said serial data bus for receiving selected ones of a sequence of data messages on said data bus, and each including a data register for storing one of said sequence of data messages, each of said receivers including means for providing a data ready signal indicative that a data message has been stored in a corresponding data register of one of said receivers;

a random access memory means for storing data words;

a data signal processor coupled to said random access memory means for selectively erasing data words stored in said random access memory and storing selected data words in said random access memory in response to selected conditions;

a plurality of secondary memory devices for storing data messages having the same label word; and a sequencer means which sequentially and cyclically examines the contents of said data register of each of said plurality of receivers for determining the presence or absence of a match of said the label word of said data message stored in said receiver data register and any one of said data words stored in the said random access memory means, said sequencer means further including means for selectively storing said data messages of like-kind information having identical label words in a selected one of said plurality of secondary memory devices upon a match of said label word with one of said random access data words, and resetting said receiver data register upon an absence of a match of said label word with any one of said random access data words.

2. A multichannel data receiver system for an aircraft having a data bus for receiving data messages and distributing said data messages to a plurality of like-kind information memory devices, where said data messages have a fixed word bit length in which a plurality of bits define a label word indicating the subsystem origin of said data message, and the remainder bits define an information data word, said multi-channel data receiver system comprising:

a plurality of receivers each coupled to said serial data bus for receiving selected ones of a sequence of data messages on said data bus, and each including a data register for storing one of said sequence of data messages, each of said receivers including means for providing a data ready signal indicative that a data message has been stored in a corresponding data register of one of said receivers;

a random access memory means for storing data words;

a data signal processor coupled to said random access memory means for selectively erasing data words stored in said random access memory and storing selected data words in said random access memory in response to phases of flight of said aircraft;

a plurality of secondary memory devices for storing data messages having the same label word; and a sequencer means which sequentially and cyclically examines the contents of said data register of each of said plurality of receivers for determining the presence or absence of a match of said the label word of said data message stored in said receiver data register and any one of said data words stored in the said random access memory means, said sequencer means further including means for selectively storing said data messages of like-kind information having identical label words in a selected one of said plurality of secondary memory devices upon a match of said label word with one of said random access data words, and resetting said receiver data register upon an absence of a match of said label word with any one of said random access data words.

* * * * *